(12) United States Patent
Nedorezov et al.

(10) Patent No.: US 8,784,265 B2
(45) Date of Patent: Jul. 22, 2014

(54) METHOD FOR STARTING AN ENGINE

(71) Applicant: Ford Global Technologies, LLC, Dearborn, MI (US)

(72) Inventors: Felix Nedorezov, Rochester Hills, MI (US); Hong Jiang, Birmingham, MI (US); Alex O'Connor Gibson, Ann Arbor, MI (US); Roger Lyle Huffmaster, Canton, MI (US); Ihab S. Soliman, Irvine, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/022,662

(22) Filed: Sep. 10, 2013

(65) Prior Publication Data

US 2014/0011635 A1    Jan. 9, 2014

Related U.S. Application Data

(63) Continuation of application No. 13/841,381, filed on Mar. 15, 2013, now Pat. No. 8,529,403, which is a continuation of application No. 12/833,730, filed on Jul. 9, 2010, now Pat. No. 8,414,456.

(51) Int. Cl.
*B60W 10/02* (2006.01)
*B60W 10/06* (2006.01)

(52) U.S. Cl.
USPC .................................................. 477/115

(58) Field of Classification Search
CPC ............... B60W 10/02; B60W 10/06; B60W 2510/0685; B60W 2710/027
USPC .................................... 477/98, 115
See application file for complete search history.

(56) References Cited

U.S. PATENT DOCUMENTS

| | | |
|---|---|---|
| 4,362,133 A | 12/1982 | Malik |
| 5,004,084 A | 4/1991 | Mehr-Ayin et al. |
| 5,192,021 A | 3/1993 | Meier et al. |
| 6,055,475 A | 4/2000 | Moriyama |
| 6,161,640 A | 12/2000 | Yamaguchi |
| 6,257,759 B1 | 7/2001 | Witonsky et al. |
| 6,278,195 B1 | 8/2001 | Yamaguchi et al. |
| 6,364,436 B1 | 4/2002 | Sawada |
| 6,412,617 B1 | 7/2002 | Spijker et al. |
| 6,453,865 B2 | 9/2002 | Hirose et al. |
| 6,463,375 B2 | 10/2002 | Matsubara et al. |
| 6,537,178 B1 | 3/2003 | Takizawa et al. |
| 6,546,826 B2 | 4/2003 | Suzuki |
| 6,556,910 B2 | 4/2003 | Suzuki et al. |
| 6,648,795 B2 | 11/2003 | Kobayashi |
| 6,651,603 B2 | 11/2003 | Osada et al. |
| 6,672,267 B2 | 1/2004 | Souki et al. |

(Continued)

FOREIGN PATENT DOCUMENTS

| | | |
|---|---|---|
| DE | 102006018960 | 10/2007 |
| EP | 0848159 A1 | 6/1998 |

(Continued)

*Primary Examiner* — Edwin A Young
(74) *Attorney, Agent, or Firm* — Julia Voutyras; Alleman Hall McCoy Russell & Tuttle LLP

(57) ABSTRACT

A method for improving starting of an engine that may be repeatedly stopped and started is presented. In one embodiment, the method adjusts a transmission actuator in response to engine combustion during an engine start. The method may improve vehicle launch for stop/start vehicles.

20 Claims, 7 Drawing Sheets

(56) References Cited

U.S. PATENT DOCUMENTS

| | | |
|---|---|---|
| 6,695,743 B2 | 2/2004 | Tanaka et al. |
| 6,730,000 B1 | 5/2004 | Leising et al. |
| 6,736,755 B2 | 5/2004 | Kato |
| 6,754,579 B2 | 6/2004 | Kamiya et al. |
| 6,763,903 B2 | 7/2004 | Morimoto et al. |
| 6,834,632 B2 | 12/2004 | Kataoka et al. |
| 6,848,552 B2 | 2/2005 | Miller |
| 6,857,491 B2 | 2/2005 | Wakashiro et al. |
| 6,875,154 B2 | 4/2005 | Mitsutani et al. |
| 6,881,171 B2 | 4/2005 | Kuhstrebe et al. |
| 7,040,304 B2 | 5/2006 | Kassner |
| 7,066,128 B2 | 6/2006 | Satake et al. |
| 7,103,468 B2 | 9/2006 | Wakashiro et al. |
| 7,134,414 B2 | 11/2006 | Ries-Mueller et al. |
| 7,146,960 B2 | 12/2006 | Phlips et al. |
| 7,159,561 B1 | 1/2007 | Kerns et al. |
| 7,191,755 B2 | 3/2007 | Vint |
| 7,191,756 B2 | 3/2007 | Phlips et al. |
| 7,247,123 B2 | 7/2007 | Ohtake et al. |
| 7,275,509 B2 | 10/2007 | Kassner |
| 7,305,300 B2 | 12/2007 | Gibson et al. |
| 7,406,939 B2 | 8/2008 | Asahara et al. |
| 7,933,711 B1 | 4/2011 | Ulrey et al. |
| 2003/0209373 A1 | 11/2003 | Egami et al. |
| 2005/0279543 A1 | 12/2005 | Seufert et al. |
| 2006/0048734 A1 | 3/2006 | Kataoka et al. |
| 2006/0157023 A1 | 7/2006 | Matsuki et al. |
| 2006/0272869 A1 | 12/2006 | Hidaka et al. |
| 2007/0004555 A1 | 1/2007 | Berger |
| 2007/0006831 A1 | 1/2007 | Leone et al. |
| 2007/0078040 A1 | 4/2007 | Nobumoto et al. |
| 2007/0114082 A1 | 5/2007 | Nozaki et al. |
| 2007/0167284 A1 | 7/2007 | Steinhauser et al. |
| 2007/0179695 A1 | 8/2007 | Reinke et al. |
| 2007/0192018 A1 | 8/2007 | Gibson et al. |
| 2007/0209618 A1 | 9/2007 | Leone |
| 2007/0209619 A1 | 9/2007 | Leone |
| 2007/0225888 A1 | 9/2007 | Morris |
| 2007/0295475 A1 | 12/2007 | Samie et al. |
| 2008/0254940 A1 | 10/2008 | Stoffels et al. |
| 2008/0257619 A1 | 10/2008 | Yamazaki |
| 2009/0018715 A1 | 1/2009 | Kanayama |
| 2009/0020091 A1 | 1/2009 | Botzenhard et al. |
| 2010/0105521 A1 | 4/2010 | Kondo et al. |
| 2010/0174459 A1 | 7/2010 | Gibson et al. |
| 2010/0197441 A1 | 8/2010 | Pursifull |
| 2011/0132308 A1 | 6/2011 | Liu et al. |
| 2011/0172890 A1 | 7/2011 | Ulrey et al. |
| 2012/0216767 A1 | 8/2012 | Ulrey et al. |

FOREIGN PATENT DOCUMENTS

| | | |
|---|---|---|
| EP | 1367246 | 3/2003 |
| EP | 1052401 | 9/2003 |
| EP | 0990793 | 8/2004 |
| EP | 1052400 | 10/2004 |
| GB | 2448671 | 10/2008 |
| JP | 11082088 | 3/1999 |
| JP | 2001193540 | 1/2001 |
| JP | 2003214210 | 7/2003 |
| JP | 2007315316 | 12/2007 |
| WO | 2009024305 | 2/2009 |

METHOD FOR STARTING AN ENGINE

CROSS REFERENCE TO RELATED APPLICATIONS

The present application is a continuation of U.S. patent application Ser. No. 13/841,381 filed Mar. 15, 2013, now U.S. Pat. No. 8,529,403, which is a continuation of U.S. patent application Ser. No. 12/833,730 filed Jul. 9, 2010, now U.S. Pat. No. 8,414,456, the entire contents of each of which are incorporated herein by reference for all purposes.

FIELD

The present description relates to a system for improving starting of an engine. The method may be particularly useful for engines that are often stopped and then restarted.

BACKGROUND AND SUMMARY

Vehicle manufacturers have realized that it may be desirable under some conditions to automatically start and stop an engine of a vehicle. Stopping the engine can reduce fuel consumption, especially when the vehicle is stopped for longer periods of time, in stop-and-go traffic for example. However, supplying the driver with a desired amount of wheel torque shortly after engine restart may be difficult because of torque management within a transmission. For example, if transmission clutches are in an open state during engine starting, a wheel torque response delay may be perceived by the driver. Further, the timing at which torque is transferred through the transmission may vary from start to start, thereby leaving the driver with an impression of inconsistent engine restarting.

The inventors herein have recognized the above-mentioned disadvantages and have developed a method for improving engine starting.

One embodiment of the present description includes a method for starting an engine, comprising: stopping the engine; and during an engine start, adjusting a transmission tie-up force in response to a timing of a first combustion event of a cylinder.

By adjusting a transmission tie-up force in response to an engine event during starting, starting consistency and engine torque management can be improved. For example, transmission clutches can be adjusted based on the timing of a predicted first combustion event of an engine during an engine restart to reduce a torque transfer delay from an engine to a transmission. Further, linking transmission clutch actuation to a more repeatable condition can lessen a driver's perception of inconsistent engine restarting.

The present description may provide several advantages. Specifically, the approach may improve engine starting consistency. In addition, the approach may improve driver demanded wheel torque response time. Further, the approach may simplify a torque management system since torque transfer may be synchronized to an event that is more repeatable and easily identifiable.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
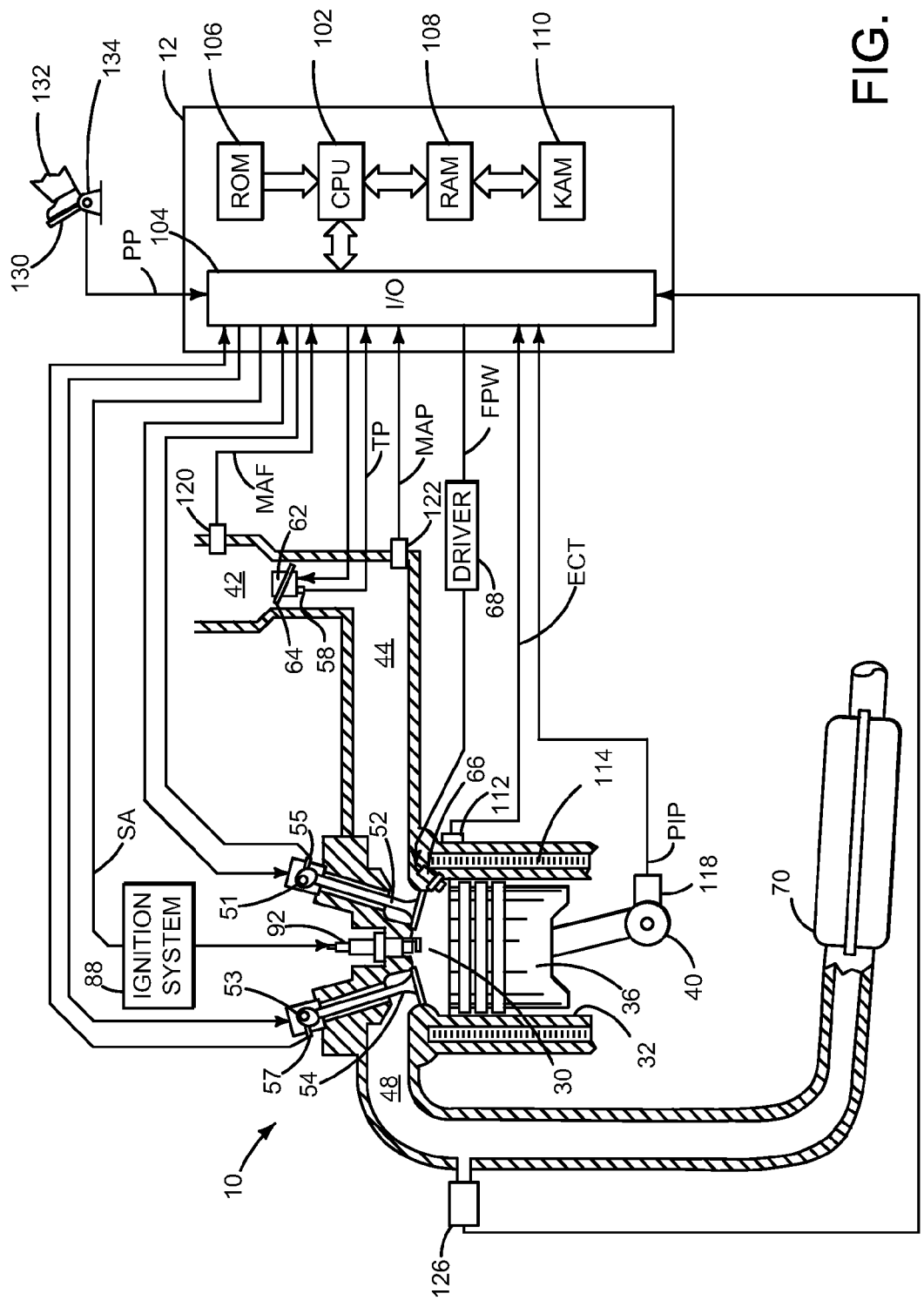
FIG. 1 is a schematic diagram of an engine.
Figure 2:
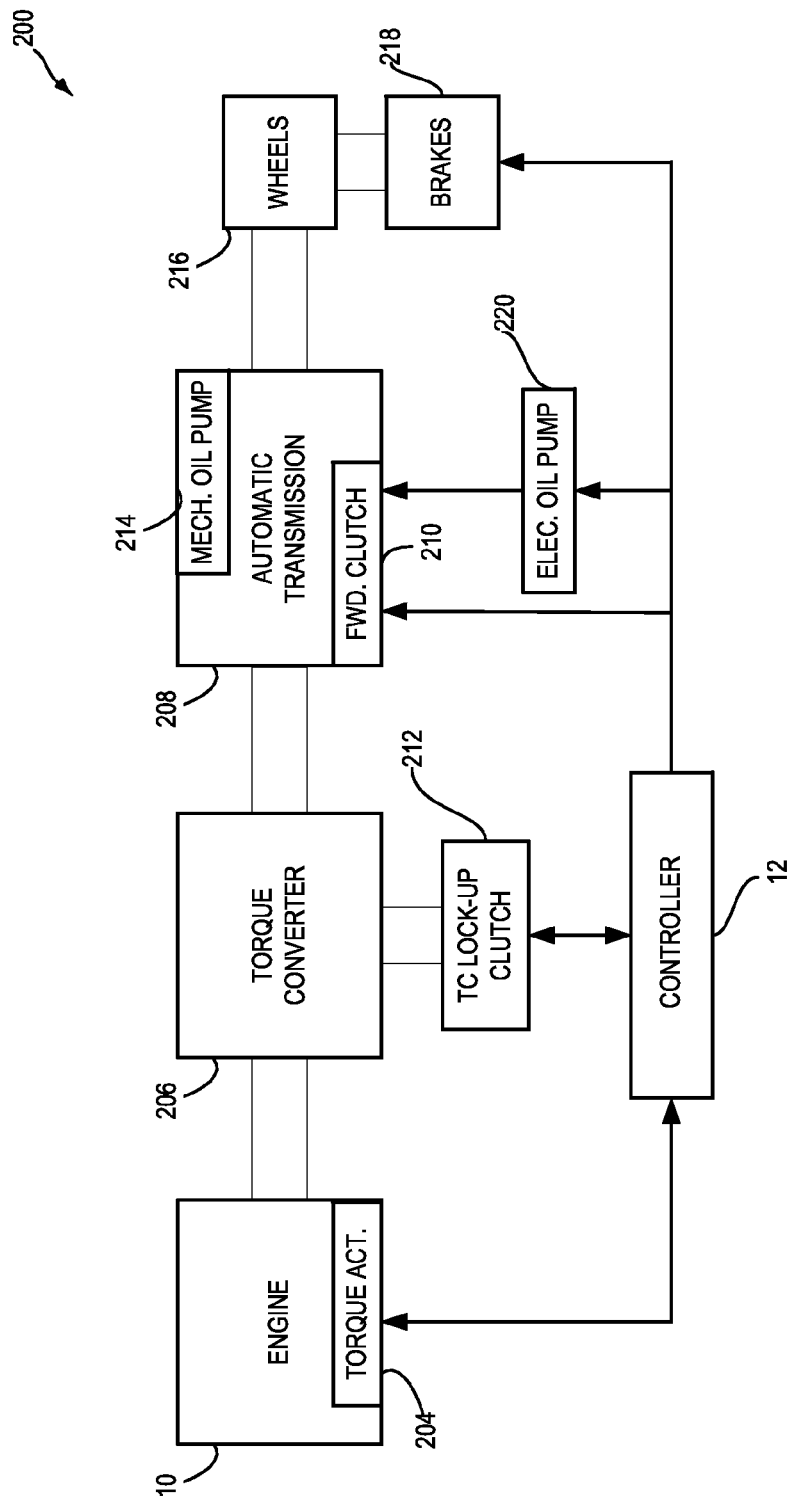
FIG. 2 is shows an example vehicle system layout.

The present description is related to automatically starting an engine coupled to a transmission. In one non-limiting example, the engine may be configured as illustrated in FIG. 1. Further, the engine may be part of a vehicle as illustrated in FIG. 2.

Figure 3:
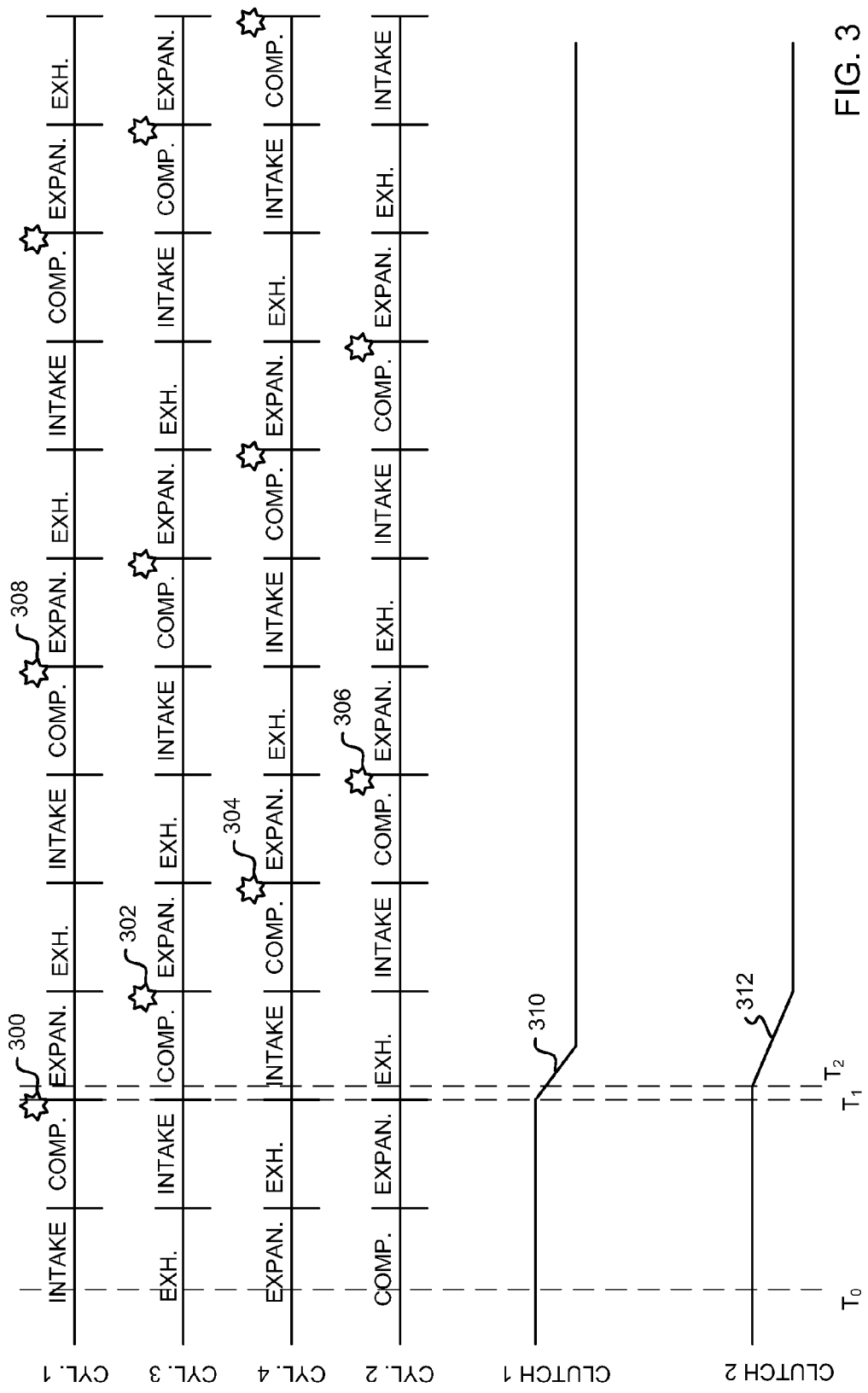
FIG. 3 is an example plot of signals of interest during a simulated engine start.
Figure 4:
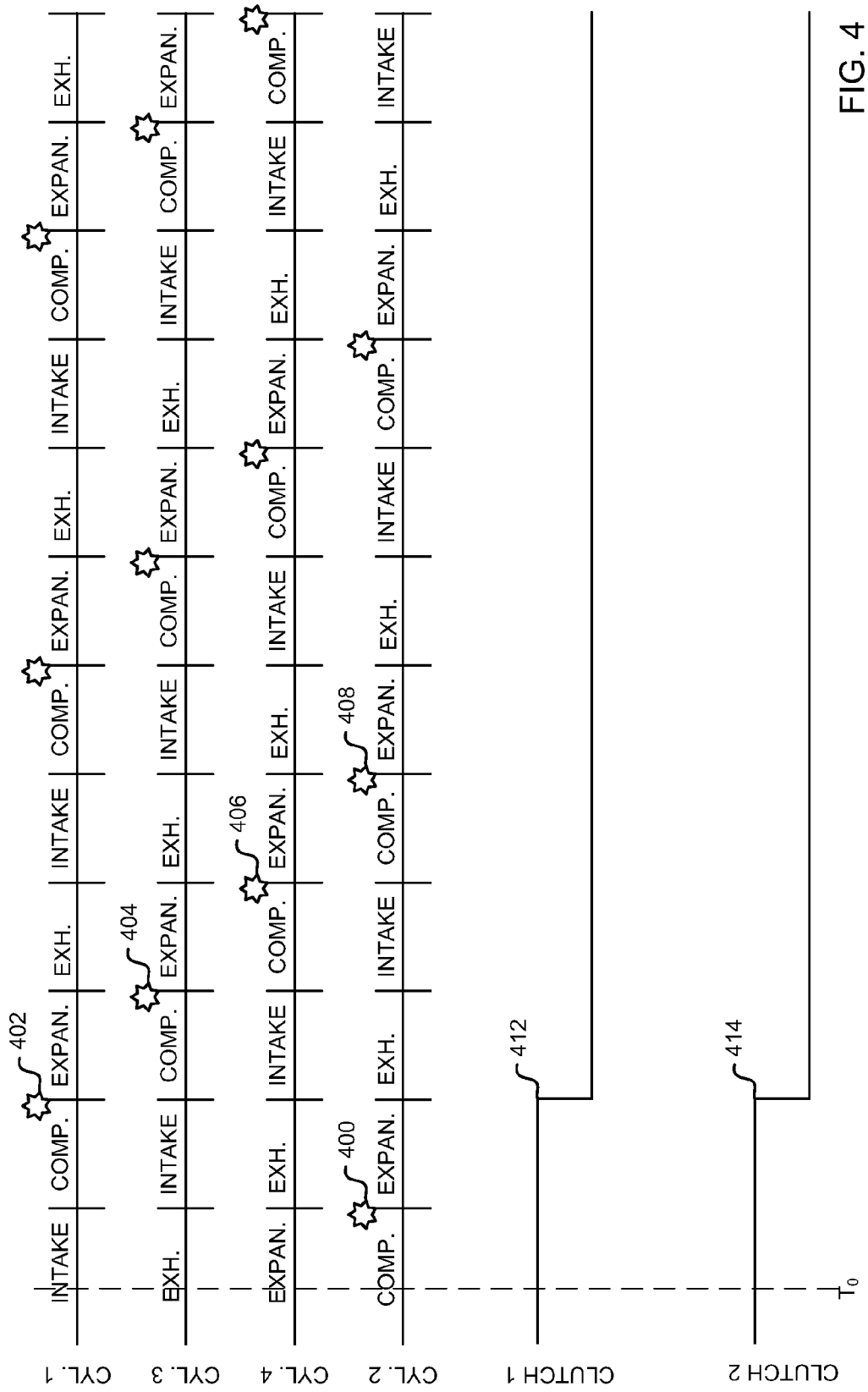
FIG. 4 is another example plot of signals of interest during a simulated engine start.
Figure 5:
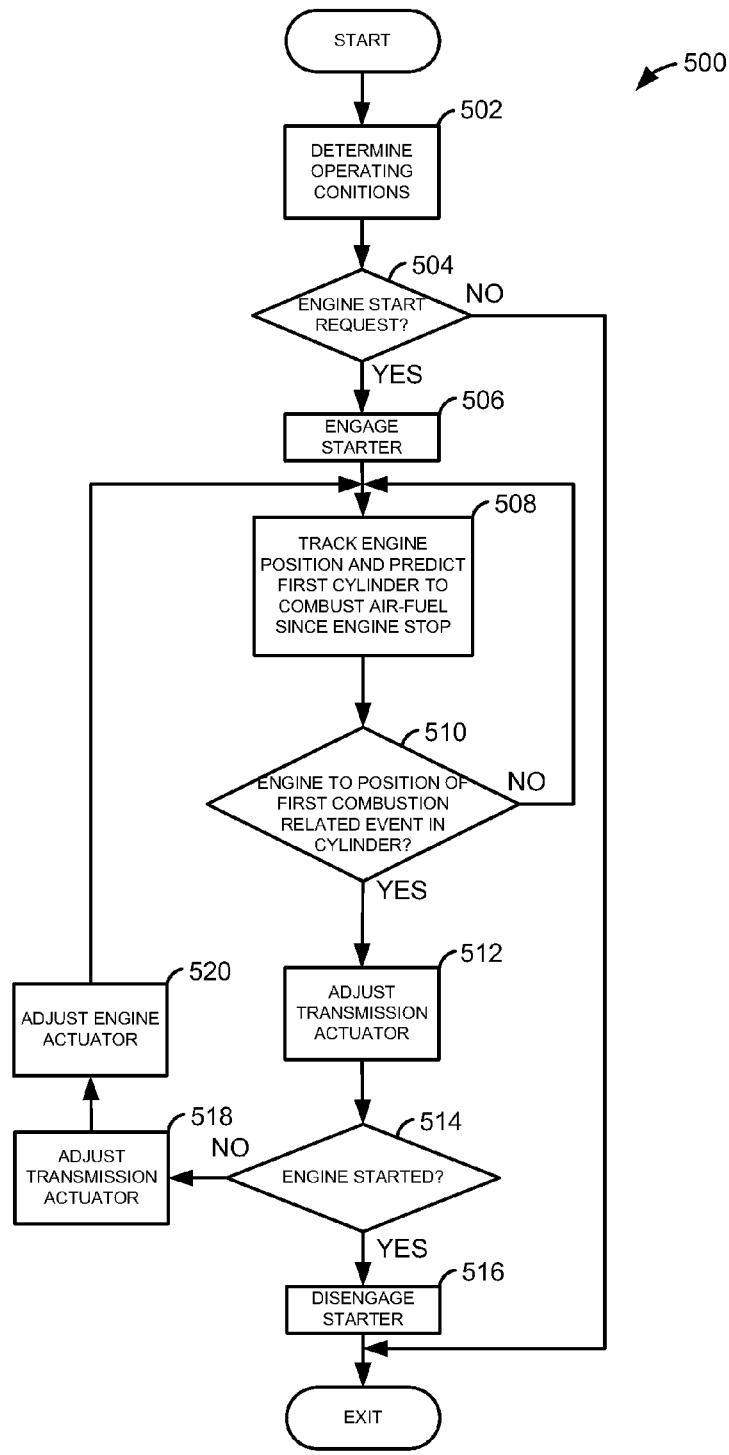
FIG. 5 is a flowchart of an example engine starting routine.
Figure 6:
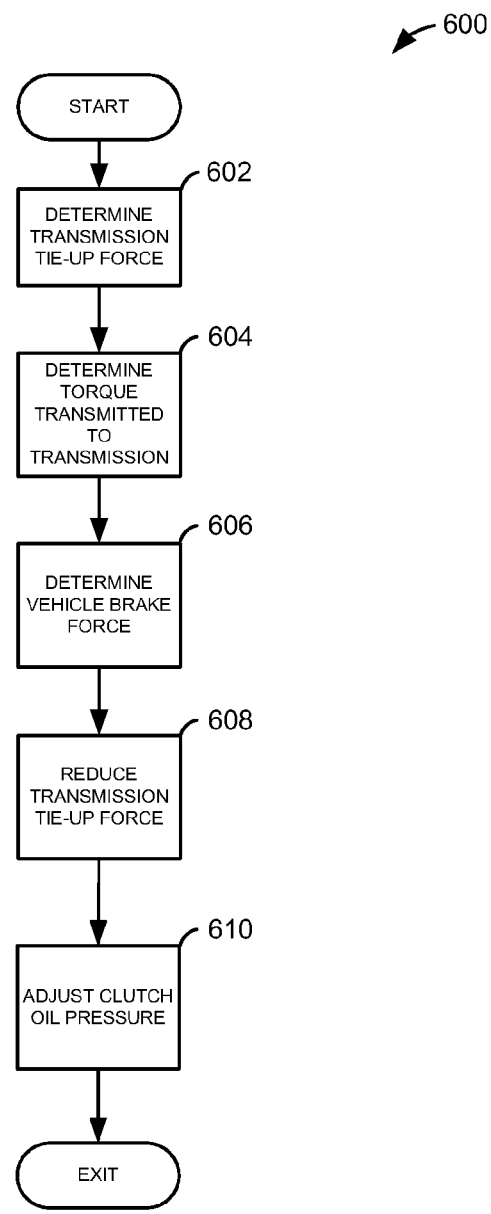
FIG. 6 is a flowchart of an example transmission tie-up release routine.

Engine starting may be performed according to the methods described by FIGS. 5-6. The method of FIG. 5 may be used to transition transmission torque control during the engine start so that the response to a driver's demand is improved. The method of FIG. 6 describes untying a transmission during an engine start so that the driver experiences a smoother launch. Thus, the methods described in FIGS. 5-6 can be used during an engine start to improve a driver's perception of vehicle starting and launch. Further, FIG. 7 describes a transmission tie-up strategy for determining transmission tie-up force during an engine stop. FIGS. 3-4 illustrate signals of interest during engine starting according to the methods of FIGS. 5-6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208. Further, one or more clutches may be engaged, including forward clutch 210, to propel a vehicle. In one example, the torque converter may be referred to as a component of the transmission. Further, transmission 208 may include a plurality of gear clutches that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle. Specifically, automatic transmission 208 may transfer an input driving torque at the input shaft (not shown) responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 42 may initiate engine shutdown by shutting off fuel and spark to the engine. Further, to maintain an amount of torsion in the transmission, the controller may ground rotating elements of transmission 208 to a case of the transmission and thereby to the frame of the vehicle. As further elaborated with reference to FIG. 7, the controller may engage one or more transmission clutches, such as forward clutch 210, and lock the engaged transmission clutch(es) to the transmission case and vehicle frame. A clutch pressure may be varied (e.g., increased) to adjust the engagement state of a transmission clutch, and provide a desired amount of transmission torsion. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming cylinder combustion. As further elaborated with reference to FIGS. 5-6, to launch the vehicle, transmission 208 may be unlocked and the wheel brakes 218 may be released, to return torque to the driving wheels 216. A clutch pressure may be adjusted to unlock the transmission, while a wheel brake pressure may be adjusted to coordinate the release of the brakes with the unlocking of the transmission, and a launch of the vehicle.

Referring to FIG. 3, an example plot of a simulated engine start sequence by the method of FIG. 5 is shown. Time begins on the left side of the plot and increases to the right side of the plot. The illustrated sequence represents a start of a non-limiting four cylinder four cycle engine. In this example, the vertical markers between cylinder position traces CYL. 1-4, represent top-dead-center or bottom-dead-center for the respective cylinder strokes. And, there are 180 crankshaft degrees between each vertical marker.

The first plot from the top of the figure represents position of cylinder number one. And, in particular, the stroke of cylinder number one as the engine crankshaft is rotated. To the left of $T_0$, the engine is stopped and at rest. At $T_0$, the engine crankshaft begins to rotate from torque provided by a starter motor. Strokes of cylinder 1-4 are labeled according to the engine position that the engine assumed at engine stop. For example, cylinder number one is shown on an intake stroke at engine stop before time $T_0$. After $T_0$, the engine rotates and cylinder number one enters the compression stroke followed by expansion and exhaust strokes. The cylinder cycle for cylinder number one then repeats. For a four stroke engine, a cylinder cycle may be 720°, the same crankshaft interval for a complete cycle of the engine. The star at label 300 indicates the first ignition event for the first combustion event since engine stop. Star 308 represents the second combustion event for cylinder number one after engine stop and the fifth combustion event since engine stop. The ignition may be initiated by a spark plug or by compression. In this sequence, cylinder number one valves are open for at least a portion of the intake stroke to provide air to the cylinder. Fuel may be injected to the engine cylinders by port or direct injectors. The fuel and air mixture is compressed and ignited during the compression stroke. Peak cylinder pressure may occur at top-dead-center of compression stroke or during the expansion stoke.

It should be noted that engine position may be determined at the time of engine stop by tracking engine position as spark and fuel are deactivated. In one embodiment, when the engine is substantially stopped, engine position is determined and stored to memory for retrieval during the next engine start. In another embodiment, engine position may be determined at engine start after the engine begins to rotate by sensing camshaft and crankshaft positions.

The second cylinder position trace from the top of the figure represents the position and stroke for cylinder number three. Since the combustion order of this particular engine is 1-3-4-2, the second combustion event from engine stop is initiated at 302 as indicated by the star. Star 302 represents the initiation of the first combustion event for cylinder number three after engine stop and the second combustion event from the engine stop.

The third cylinder position trace from the top of the figure represents the position and stroke for cylinder number four. Star 304 represents the initiation of the first combustion event for cylinder number four after engine stop and the third combustion event from the engine stop.

The fourth cylinder position trace from the top of the figure represents the position and stroke for cylinder number two. Star 306 represents the initiation of the first combustion event for cylinder number two after engine stop and the fourth combustion event from the engine stop.

It should be noted that the first cylinder to combust an air-fuel mixture can vary depending on the engine stopping position and the method of determining engine position. In some embodiments fuel may not be delivered to one or more engine cylinders until engine position is established. In other embodiments, fuel may be delivered before or as soon as the engine begins to rotate without regard to the engine stopping position.

The fifth plot from the top of the figure shows one example of timing of adjusting an actuator of a transmission, in particular a transmission clutch, to adjust a tie-up force in response to a first combustion event of a cylinder. The high portion of the CLUTCH 1 signal, left of vertical marker $T_1$, indicates a higher force is applied to the transmission by clutch 1. The low portion of the CLUTCH 1 signal, at the end of the ramp after vertical marker $T_1$, indicates a lower force is applied to the transmission by clutch 1. Thus, a higher force is applied by clutch 1 to the transmission during an engine stop and begins to release at vertical marker $T_1$ in response to timing of combustion event 300. The amplitude of the higher portion of the CLUTCH 1 may be adjusted based on operating conditions to control the transmission tie-up force.

CLUTCH 1 signal is ramped at 310 to gradually release a tie-up force that is applied to the transmission so that clutch 1 begins to release the rotating components of the transmission from the transmission case and the vehicle chassis. For example, clutch 1 may release a transmission shaft. The ramp rate of CLUTCH 1 signal may be proportional to the amount of torque applied to the transmission input shaft and to the force applied to vehicle brakes. Further, the CLUTCH 1 ramp rate may be varied according to operating conditions. For example, the ramp rate of the CLUTCH 1 signal may decrease with transmission oil temperature. In another example, the ramp rate of the CLUTCH 1 signal may decrease as the force applied to vehicle brakes during transmission tie-up increases.

It should be noted that a reduction in tie-up force applied to the transmission by clutch 1 may be timed relative to timing of first combustion events in cylinders 2-4 as an alternative. Further, the timing of adjustment of the CLUTCH 1 signal does have to be coincident with the exact timing of a first combustion event of a particular cylinder. Rather, the timing of adjustment of CLUTCH 1 signal may be relative to the timing of a first combustion event of a cylinder. Thus, CLUTCH 1 signal may start to ramp before or after a first combustion event of a cylinder, but the starting timing of the ramp is relative to a first combustion event of a cylinder.

In one example, combustion timing of a first combustion event of a cylinder may be determined from the engine stopping position. As shown in FIG. 3, it can be determined that cylinder 1 may be the first cylinder to combust as it is the first cylinder to complete intake and compression strokes. Alternatively, cylinder 2 may be determined to be the first cylinder to combust an air-fuel mixture if fuel may be injected into a cylinder that is holding an air charge. Thus, based on the engine stopping position and the engine configuration (e.g., direct injector or port injection), it may be determined which engine cylinder is capable of a first combustion event. In addition, since the order of combustion of an engine is know, the first combustion events since engine stop may be determined for other cylinders based on the first combustion event since engine stop.

The sixth plot from the top of the figure shows timing of adjusting another actuator of a transmission, in particular a transmission clutch, to adjust a tie-up force in response to a first combustion event of a cylinder. Similar to the CLUTCH 1 signal, the high portion of the CLUTCH 2 signal, left of vertical marker $T_2$, indicates higher force is applied to the transmission by clutch 2. The low portion of the CLUTCH 2 signal, at the end of the ramp after 312, indicates a lower force is applied to the transmission by clutch 2. Thus, a higher force is applied by clutch 1 to the transmission during an engine stop and begins to release at vertical marker $T_2$ in response to timing of combustion event 300. The amplitude of the higher portion of the CLUTCH 2 may be adjusted based on operating conditions to control the transmission tie-up force.

Signal CLUTCH 2 reduces the tie-up force applied to the transmission by clutch 2 after signal CLUTCH 1 begins to reduce the tie-up force applied to the transmission by clutch 1. Thus, signals CLUTCH 1 and CLUTCH 2 may be sequenced relative to a first combustion event of a cylinder since engine stop. Further, the ramp rates of ramps 310 and 312 may be different as shown in FIG. 3. The clutch ramp rates may vary from clutch to clutch based on the position of the clutch in the transmission as well as the input torque applied to the transmission input shaft.

Signals CLUTCH 1 and CLUTCH 2 are representative of control signals for tying and untying a transmission. In some embodiments, only a single clutch may tie-up a transmission while in other embodiments three or more clutches may tie-up a transmission. Thus, only signal CLUTCH 1 may apply for some transmissions. Further, signals CLUTCH 1 and CLUTCH 2 are not necessarily intended to correspond with a $1^{st}$ gear clutch and a $2^{nd}$ gear clutch, but rather any two clutches that act to tie-up a transmission when applied. In other examples, transmission clutches may be simultaneously released. Further, in some examples, two or more clutches may be released with the same release timing or release rate.

Turning now to FIG. 4, another example plot of a simulated engine start sequence by the method of FIG. 5 is shown. Time begins on the left side of the plot and increases to the right side of the plot. Similar to FIG. 3, the illustrated sequence represents a start of a non-limiting four cylinder four cycle engine. In this example, the vertical markers represent top-dead-center or bottom-dead-center for the respective cylinder strokes. And, there are 180° crankshaft degrees between each vertical marker.

The first plot from the top of the figure represents position of cylinder number one. And, in particular, the stroke of cylinder number one as the engine crankshaft is rotated. To the left of $T_0$, the engine is stopped or at rest. At $T_0$, the engine crankshaft begins to rotate from torque provided by a starter motor. Strokes of cylinder 1-4 are labeled according to the engine position that the engine assumed at engine stop. For example, cylinder number one is shown on an intake stroke at engine stop before time $T_0$. After $T_0$, the engine rotates and cylinder number one enters the compression stroke followed by expansion and exhaust strokes. The cylinder cycle for cylinder number one then repeats.

The star at label 400 indicates the first ignition event for the first combustion event since engine stop. In this example, cylinder number two is the first cylinder to combust an air-fuel mixture. Such a starting sequence is available for a direct injection engine. Star 408 represents the second combustion event for cylinder number two after engine stop and it is the fifth combustion event since engine stop. In this sequence, cylinder number two valves are closed and air is trapped in the cylinder during the engine stop. Fuel is injected into cylinder number two while the engine is stopped. The fuel and air mixture are subsequently ignited during the compression stroke. In some examples, the air-fuel mixture of a cylinder in a compression stroke may be ignited before engine rotation.

Since the combustion order of this particular engine is 1-3-4-2, the second combustion event from engine stop is initiated at 402 as indicated by the star. Star 402 represents the initiation of the first combustion event for cylinder number one after engine stop and the second combustion event from the engine stop. Star 406 represents the initiation of the first combustion event for cylinder number four after engine stop and the third combustion event from the engine stop. Star 406 represents the initiation of the first combustion event for cylinder number two after engine stop and the fourth combustion event from the engine stop.

The fifth plot from the top of the Figure shows one example timing of adjusting an actuator of a transmission, in particular a transmission clutch, to adjust a tie-up force in response to a first combustion event of a cylinder. The high portion of the CLUTCH 1 signal, left of marker 412, indicates a higher force is applied to the transmission by clutch 1. The low portion of the CLUTCH 1 signal indicates a lower force is applied to the transmission by clutch 1. Thus, a higher force is applied by clutch 1 to the transmission during an engine stop and is released at marker 412 in response to timing of combustion event 402. The amplitude of the higher portion of CLUTCH 1 may be adjusted based on operating conditions to control the transmission tie-up force as described in FIG. 7, for example.

CLUTCH 1 signal is released in a step-wise manner so that clutch 1 begins to release the rotating components of the transmission from the transmission case and the vehicle chassis. For example, the CLUTCH 1 signal may release a transmission shaft.

In this example, a reduction in tie-up force applied to the transmission by CLUTCH 1 is timed relative to timing of a first combustion event in cylinder number one even though cylinder number two is the first cylinder to combust an air-fuel mixture. Further, the timing of adjustment of the CLUTCH 1 signal is shown coincident with the timing of the CLUTCH 2 signal, but the timing of signals CLUTCH 1 and CLUTCH 2 does not have to be coincident with a first combustion event of a particular cylinder.

The sixth plot from the top of the Figure shows timing of adjusting another actuator of a transmission, in particular a transmission clutch, to adjust a tie-up force in response to a first combustion event of a cylinder. Similar to the CLUTCH 1 signal, the high portion of the CLUTCH 2 signal, left of marker 414, indicates higher force is applied to the transmission by clutch 2. The low portion of the CLUTCH 2 signal indicates a lower force is applied to the transmission by clutch 2. Thus, a higher force is applied by clutch 1 to the transmission during an engine stop and is released at markers 412 and 414 in response to timing of combustion event 402. The amplitude of the higher portion of the signals CLUTCH 1 and CLUTCH 2 may be adjusted based on operating conditions to control the transmission tie-up force.

Signals CLUTCH 1 and CLUTCH 2 are representative of control signals for tying and untying a transmission. In some embodiments, only a single clutch may tie-up a transmission while in other embodiments three or more clutches may tie-up a transmission. Thus, only signal CLUTCH 1 may apply for some transmissions. Further, signals CLUTCH 1 and CLUTCH 2 are not necessarily intended to correspond with a $1^{st}$ gear clutch and a $2^{nd}$ gear clutch, but rather any two clutches that act to tie-up a transmission when applied.

Referring now to FIG. 5, a flowchart of an example engine starting routine is shown. At 502, routine 500 determines operating conditions. Operating conditions may include but are not limited to engine temperature, ambient air temperature, barometric pressure (e.g., an indication of altitude), engine crankshaft position, engine camshaft position, torque converter input speed, torque converter output speed, vehicle brake pressure, humidity, transmission oil temperature, transmission oil pressure, engine position, and fuel type. Engine position at stop may be retrieved from memory or by interpreting engine position sensor information while the engine is stopped. Routine 500 proceeds to 504 after operating conditions are determined.

At 504, routine 500 judges whether or not an engine start request has been made after an engine stop. An engine start request may be made by a driver's act (e.g., changing the position of an actuator such as a brake pedal or accelerator pedal) or by a controller that automatically requests an engine start in response to operating conditions (e.g., low battery state of charge, an air conditioning request, change of a traffic signal, a preceding vehicle moving away from the stopped vehicle). If routine 500 judges that an engine start request has been made, routine 500 proceeds to 506. Otherwise, routine 500 proceeds to exit.

At 506, routine 500 engages a starter and begins to rotate the vehicle engine for starting. Further, injection of fuel and spark are initiated at 506. Fuel injection and spark may be sequentially delivered to engine cylinders according to engine position and the order of combustion in engine cylinders. Alternatively, the engine may be directly started by injecting fuel to a cylinder and igniting an air-fuel mixture with a spark. In direct start applications, routine 500 may determine the first engine combustion event by predicting that the first cylinder to receive fuel will be the cylinder to first combust an air-fuel mixture after an engine stop. Routine 500 proceeds to 508 after the engine starter is engaged or after initiating direct start.

At 508, routine 500 tracks engine position as the engine rotates and predicts the engine position of a first combustion event since engine stop. Engine position is tracked using position information gathered from crankshaft and camshaft position sensors. Further, the camshaft and crankshaft sensors may be used to update an engine position stored in memory from the last engine stop. For example, as shown in FIG. 3, if a four cylinder engine stops with cylinder number one in an intake stroke routine 500 may determine that cylinder number one will be the first cylinder to combust an air-fuel mixture since engine stop because cylinder number one has a fresh air charge that can be mixed with fuel that is port or directly injected to cylinder number one. Thus, routine 500 may judge or predict that cylinder number one will the first cylinder to combust an air-fuel mixture. Further, routine 500 may determine the engine crankshaft position at which combustion will begin since the engine controller sets the spark timing. In another example, routine 500 may predict the location of peak cylinder pressure based on the cylinder air charge and the spark timing of cylinder number one. Thus, routine 500 can determine the timing of events that are related to the first combustion event in cylinder number one since engine stop.

The timing or predicted timing of events related to the first combustion event of cylinder number one may be used at 512 as a reference timing to adjust a transmission actuator such as a transmission clutch or a transmission pressure control valve. Similarly, since the order of combustion is known for the engine, events related to the first combustion events in cylinders 2-4 can also be determined and/or predicted. In other examples, the output of a sensor may be used to determine an event of a cylinder that is related to a first combustion event in the cylinder. For example, a pressure transducer may be used to monitor cylinder pressure in cylinder number one. The first time pressure in cylinder number one exceeds a threshold pressure since an engine stop may be used to identify a first combustion event in cylinder number one. Thus, an event related to the first combustion event in an engine cylinder may be predicted and tracked based on engine position information or it may be sensed by a transducer. In another example, an ion sensing device may determine an engine event. Routine 500 proceeds to 510 after tracking engine position and events related to first combustion events in engine cylinders.

At 510, routine 500 judges whether or not the engine is at a position related to a first combustion event in an engine cylinder. In one example, routine 500 may track engine position and predict an event related to a first combustion event of an engine since engine stop. In another example, routine 500 may track engine position and predict an event related to a first combustion event of a particular engine cylinder. If routine 500 judges that the engine is at a position that corresponds to a first combustion event of a cylinder, or a position of a predicted first combustion event, routine 500 proceeds to 512. Otherwise, routine 500 returns to 508.

At 512, routine 500 begins to adjust a transmission actuator to reduce a tie-up force applied to the transmission. In one example, the force applied by a gear clutch may be reduced to reduce the transmission tie-up force. By reducing the transmission tie-up force some of the torque input to the transmission may be directed to the transmission output and vehicle wheels. As shown and described by FIGS. 3-4, the rate of release and timing of transmission clutch may be related to the amount of torque at the transmission input shaft as well as the amount of force applied to vehicle brakes. Further, in another example, the timing of a reduction of force applied to one clutch tying up the transmission, relative to a first combustion event of an engine cylinder, can be varied from a reduction of force applied to another clutch tying up the transmission. Depending on the system configuration, the type of transmission actuator that is adjusted may be different. For example, in one example a position of a valve actuator that supplies oil to a transmission clutch may be adjusted. In another example, a solenoid that controls line pressure of oil in the transmission may be adjusted. Further, the voltage or current supplied to an oil pump supplying oil to the transmission may be varied when routine 500 judges that the engine is at a position that is related to a first combustion event of a cylinder. The method of FIG. 6 provides further details as to how transmission actuators may be controlled during a transmission tie-up release. Routine 500 proceeds to 514 after transmission actuators are adjusted.

At 514, routine 500 judges whether or not the engine is started. In one example, routine 500 judges that the engine is started when engine rotational speed exceeds a threshold speed. If routine 500 judges that the engine is started, routine 500 proceeds to 516. Otherwise, routine 500 proceeds to 518.

At 516, the routine 500 disengages the engine starter. In some examples the starter pinion may be withdrawn when engine speed reaches a threshold speed. Further, the starter may include an over-running clutch so that the starter speed is not increased by the accelerating engine. Routine 500 exits after the engine starter is disengaged.

At 518, routine 500 adjusts the position of transmission actuators. In one example, routine 500 can increase the force applied to tie-up the transmission since it has been judged at 514 that the engine has not yet started. The transmission actuators may be adjusted to positions or states that they assumed prior to an adjustment at 512. In another example, the transmission actuators may be adjusted to positions or states between the states the actuators assumed at engine stop and the positions they were adjusted to at 512. Routine 500 proceeds to 520 after the transmission actuators are adjusted.

At 520, routine 500 adjusts engine actuators. In one example, routine 500 may increase an amount of fuel injected to engine cylinders to improve the possibility of engine starting. Further, routine 500 can adjust spark timing and cylinder air amount to improve the possibility of engine starting. Routine 500 returns to 508 after engine actuators are adjusted to improve the possibility of engine starting.

Referring now to FIG. 6, a flowchart of an example transmission tie-up release routine is shown. At 602, routine 600 determines the transmission tie-up force. In one example, the transmission tie-up force may be determined by reading a value stored in memory of a controller by the routine of FIG. 7. In an alternative example, the transmission tie-up force may be determined from oil pressure supplied to one or more transmission clutches. In particular, the oil pressure supplied to a clutch is read with a pressure transducer. The clutch oil pressure can be converted to a force by inputting the measured oil pressure into a function that describes clutch force in response to clutch oil pressure. Routine 600 proceeds to 604 after determining transmission tie-up force.

At 604, routine 600 determines an amount of torque transmitted to the transmission. In one example, the amount of torque transmitted to the engine may be determined from engine speed. In particular, engine speed may be input to a function that describes torque converter output torque as a function of input speed. Transmission input torque is determined by interrogating a look-up table that relates engine speed to torque converter output torque which translates into transmission input torque. Routine 600 proceeds to 606 after the transmission input torque is determined.

At 606, routine 600 determines the vehicle brake force. In one example, the vehicle brake force may be determined by reading a value stored in memory of a controller by the routine of FIG. 7. In an alternative example, the brake force may be determined from oil pressure supplied to vehicle brakes. In particular, the oil pressure supplied to vehicle brakes is read with a pressure transducer. The brake oil pressure can be converted to a force by inputting the measured oil pressure into a function that describes brake force in response to oil pressure. Routine 600 proceeds to 608 after determining vehicle brake force.

At 608, routine 600 reduces transmission tie-up force. In one example, the timing of releasing of transmission tie-up force may be determined by making an inquiry to one or more two-dimensional tables that hold empirically determined clutch release timings. In another example, the clutch release rate may be determined by making an inquiry to one or more two-dimensional tables that hold empirically determined clutch release rates. Data in the two-dimensional tables may be retrieved by indexing the two-dimensional tables with transmission input torque as determined at 604 and brake force as determined at 606. The output of the two-dimensional table defines the transmission clutch release timing or release rate.

It should be noted that while the force applied to transmission tie-up clutches is being reduced, the transmission remains tied up. Further, during a first condition (e.g., when a vehicle is stopped on an incline) the transmission tie-up torque is set to a first amount so that torque is not transferred from the engine to the vehicle wheels until a first engine speed is reached (e.g., an engine speed where the torque converter torque output exceeds the transmission tie-up torque). During a second condition (e.g., when a vehicle is stopped on a flat road), the transmission tie-up torque is set to a second amount, the second amount less than the first amount, so that torque is not transferred from the engine to the vehicle wheels until a second engine speed, the second engine speed less than the first engine speed. In some examples as discussed with reference to FIG. 7, the transmission tie-up torque may be set in response to the vehicle brake force. Further, when the vehicle brake force is increased the transmission tie-up force can be decreased. Thus, in some examples (e.g., when vehicle brakes are released after the transmission tie-up torque), the transmission tie-up torque can be reduced and released at a higher rate than if transmission tie-up torque is set to a higher level.

In addition, the transmission tie-up force can be reduced in response to the fuel supplied to the engine. For example, if a lower octane fuel is supplied to the engine the tie-up release rate may be reduced so that the transmission tie-up duration is increased. It may be desirable to increase the transmission tie-up duration when there is a higher possibility of engine misfire. Alternatively, the release timing can be increased so that the transmission tie-up is longer. Similarly, the transmission tie-up force release rate can be adjusted for altitude. For example, the release rate can be decreased as altitude increases. Similarly, transmission tie-up release rate or timing can be adjusted for other engine and/or transmission conditions (e.g., transmission temperature, engine temperature). Routine 600 proceeds to 610 after determining the transmission clutch release timing.

At 610, routine 600 adjusts clutch oil pressure. In one example, the pressure of oil supplied to transmission clutches may be reduced by adjusting a duty cycle of a solenoid. In particular, the duty cycle of a solenoid valve can be reduced to lower the oil pressure supplied to transmission clutches. By lowering the pressure of oil supplied to transmission clutches, transmission tie-up force is reduced. In one example, the pressure of oil supplied to clutches may be feedback controlled so that if the initial demand does not yield the desired clutch oil pressure, the control command (e.g., duty cycle) is further reduced so that the actual clutch oil pressure matches the desired clutch oil pressure. Routine 600 proceeds to exit after clutch oil pressure is adjusted.

Figure 7:
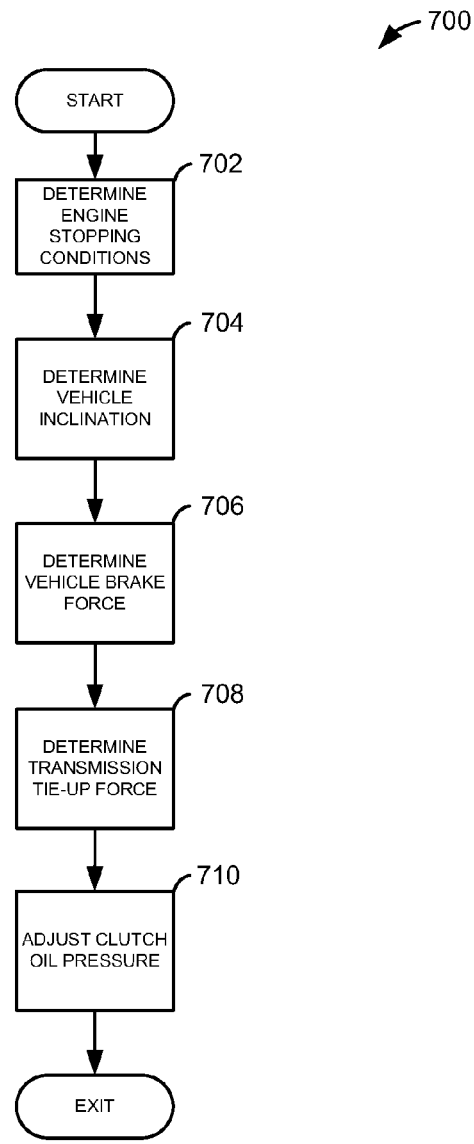
FIG. 7 is a flowchart of an example transmission tie-up strategy routine.

Referring now to FIG. 7, a flowchart of an example transmission tie-up routine is shown. At 702, routine 700 determines engine stopping conditions. Engine stopping conditions may include but are not limited to atmospheric pressure, engine temperature, cam position, ambient temperature, and throttle position. In some examples, a trailer attached signal can inhibit automatic engine stopping when it is determined that a trailer is attached to a vehicle. In other examples, the trailer mass can be estimated based on the brake force applied and the stopping distance during a vehicle stop. In other examples, the trailer mass can be estimated from F=m·a during a vehicle acceleration by solving for m based on the vehicle acceleration and the estimated torque produced by the engine. Routine 700 proceeds to 704 after engine operating conditions are determined.

At 704, routine 700 determines vehicle inclination. In one example, vehicle inclination may be determined by an inclinometer. For example, when a vehicle is parked on a substantially flat surface an inclinometer outputs a first voltage. When the vehicle is parked on a hill the inclinometer outputs a second voltage, the second voltage higher than the first. In another example, vehicle inclination may be determined from a global positioning system. Routine 700 proceeds to 706 after vehicle inclination is determined.

At 706, routine 700 determines vehicle braking force. In one example, routine 700 determines vehicle braking force according to the following equations:

$$\text{Vehicle\_Brake\_Force} = r \cdot m \cdot g \cdot \sin \Theta$$

Where Vehicle_Brake_Force is a wheel torque, r is a tire rolling radius, m is the vehicle mass, g is a gravity constant, and sin θ is the sine of the angle of the vehicle relative to a horizontal plane. In some examples, the vehicle brake force may be increased by a factor (e.g., 1.2) to account for increases in vehicle mass or other variables, thereby increasing the force applied to brakes when the engine stops. Further, the mass term m may include the vehicle mass plus any estimated trailer mass. In some examples, the vehicle brake force is stored to memory for use during engine restart and vehicle launch.

At 708, routine 700 determines the transmission tie-up force. The transmission tie-up force applied at engine stop is determined based on the vehicle launch strategy. In particular, the transmission tie-up force is set based on the following equation if vehicle brakes are released before tie-up clutches.

$$\text{Trans\_tie\_clutch\_torq} = r \cdot m \cdot g \cdot \sin \Theta$$

Where Trans_tie_clutch_torq is the transmission tie-up clutch torque, and where r, m, g, and sin θ are as described above. Further, the mass term m may include the vehicle mass plus any estimated trailer mass. Thus, if the wheel brakes are scheduled to release before the transmission tie-up clutches, then the transmission tie-up clutches are set to a force that will keep the vehicle stationary when the wheel brakes are released. In some examples, a multiplier may increase the transmission tie-up clutch force beyond that of the above equation to further limit the possibility of vehicle movement during vehicle brake release.

In another example where the vehicle wheel brakes are released after the transmission tie-up clutches, the force applied to transmission tie-up clutches can be expressed by the following equation:

$$\text{Trans\_tie\_clutch\_torq} \geq r \cdot m \cdot g \cdot \sin \Theta - T\_\text{brake}$$

Where Trans tie clutch torq, r, m, g, and sin θ are as described above and T_brake is the force applied to vehicle brakes. Further, the mass term m may include the vehicle mass plus any estimated trailer mass. Thus, according to this equation less force may be applied to the transmission tie-up clutches if the vehicle brakes are released after the transmission tie-up. However, as indicated by the greater than symbol, in some examples the transmission tie-up clutch force is increased beyond the vehicle hold force (e.g., r·m·g·sin 0).

In some examples, the transmission tie-up force may be adjusted for altitude. For example, the transmission tie-up force can be increased as altitude increases. The altitude adjustment may be implemented as a function whose output is multiplied by the transmission tie-up force to provide an altitude modified transmission tie-up force. Similarly, transmission tie-up force can be adjusted for other engine and/or transmission conditions (e.g., transmission temperature, engine temperature).

Thus, during a first condition (e.g., when a vehicle is stopped on an incline) the transmission tie-up torque is set to a first amount so that torque is not transferred from the engine to the vehicle wheels until a first engine speed is reached (e.g., an engine speed where the torque converter torque output exceeds the transmission tie-up torque). During a second condition (e.g., when a vehicle is stopped on a flat road), the transmission tie-up torque is set to a second amount, the second amount less than the first amount, so that torque is not transferred from the engine to the vehicle wheels until a second engine speed, the second engine speed less than the first engine speed. In this way, the transmission tie-up force is set to a first amount during a first engine and vehicle stop. During a second engine and vehicle stop after the first engine and vehicle stop, the transmission tie-up force is set to a second amount that is greater or less than the first amount. Routine 700 proceeds to 710 after the transmission tie-up force is determined.

At 710, routine 700 adjusts clutch oil pressure to tie-up the transmission at the desired transmission tie-up force. In one embodiment, a duty cycle of a signal that affects transmission clutch oil pressure is adjusted to vary clutch oil pressure and transmission tie-up force. In one embodiment, the duty cycle is supplied to an electric pump to control the pressure of oil supplied to transmission. In another embodiment, the duty cycle is supplied to a solenoid to control clutch oil pressure. In one embodiment, oil pressure can be increased by increasing the duty cycle of a signal applied to an electric pump that supplies oil to transmission clutches. In other embodiments, an analog signal may be supplied to a pump that controls clutch oil pressure in response to a voltage level. In each example, a transfer function related the actuator duty cycle to a force applied to the transmission clutches. In this way, the requested or desired tie-up torque is applied to the transmission clutches. In some examples, routine 700 also stores the transmission tie-up force in memory so that the tie-up force can be released in a desired manner during an engine restart. Routine 700 proceeds to exit after clutch oil pressure is adjusted.

Thus, the methods of FIGS. 5-7 provide for a method for starting an engine, comprising: stopping the engine; and during an engine start, adjusting a transmission tie-up force in response to a timing of a first combustion event of a cylinder. The method also includes where the cylinder is a first cylinder to combust an air-fuel mixture since said engine stop. In one example, the method applies where the actuator of said transmission is a clutch. The method also includes where the clutch is adjusted by varying a pressure of oil supplied to said clutch. The method further includes where the actuator of said transmission is a torque converter lockup clutch. The method also applies where the clutch is a gear clutch. The method also applies where the actuator is further adjusted during said start in response to a temperature of said transmission. The method applies where the actuator is further adjusted during said engine start in response to altitude. The method includes where said actuator is further adjusted during said engine start in response to fuel type.

The methods of FIGS. 5-7 also provide for starting an engine, comprising: stopping an engine; adjusting at least one actuator of a transmission to control a transmission tie-up force during said engine stop; and during an engine start, adjusting said at least one actuator of said transmission to decrease said transmission tie-up torque in response to a timing of a first combustion event of a cylinder of said engine since stopping the engine. The method includes where said at least one actuator is a clutch. The method includes where the at least one actuator is adjusted in response to a trailer coupled to a vehicle. In one example, the method applies where the at least one actuator is a torque converter lockup clutch. Further, the method applies where the clutch is adjusted by varying a pressure of oil supplied to said clutch. The method also includes where the clutch is a gear clutch. The method includes where said at least one actuator is further adjusted during said engine start in response to altitude.

The methods of FIGS. 5-7 also provide for a method for starting an engine, comprising: during a first condition: starting an engine while a transmission is in an operator selected state; and during a second condition, different than said first condition: stopping an engine at a first engine position; starting said engine while said transmission is in a tied-up state; and reducing a tie-up force of said transmission in response to an occurrence of a first combustion event of a cylinder since engine stop, said occurrence of a first combustion event related to said first engine position. The method includes where the first condition is a first engine start after said engine has been stopped by an operator, and where a timing of said reducing said tie-up force is predicted based on said first engine position. The method includes where the second condition is an engine start after said engine has been stopped by said controller. The method also includes where the tie-up force is reduced by opening a clutch of said transmission.

The methods of FIGS. 5-7 also provide for a method for starting an engine coupled to a transmission, comprising: stopping said engine; applying a tie-up force to said transmission during said engine stop; and reducing said tie-up force in response to an amount of torque transmitted to said transmission via a torque converter and an amount of force applied by a vehicle brake. The method includes where the transmission is tied-up by applying at least two gear clutches, the at least two gear clutches when applied ground transmission input shaft torque to a transmission case, and where said tie-up force is varied from engine stop to engine stop in response to vehicle operating conditions. In one example, the method includes where the tie-up force is reduced by an amount that releases said transmission from a tied-up state in response to said torque transmitted to said transmission via of said torque converter and in response to said force applied to said vehicle brake. The method also includes where a force applied by one of said at least two gear clutches to said transmission is reduced at a rate different from a rate a force is applied to said transmission via of a second clutch of said at least two gear clutches. The method also includes where a force applied by one of said at least two gear clutches to said transmission is reduced at a different timing from a timing a force is reduced to said transmission via a second clutch of said at least two gear clutches. The method further includes where the tie-up force is reduced by lowering an oil pressure applied to a clutch. The method also includes where the tie-up force is adjusted in response to a temperature of said transmission. The method also includes where the tie-up force is adjusted in response to altitude. The method also includes where the tie-up force is adjusted in response to fuel type.

The methods of FIGS. 5-7 also provide for a method for starting an engine coupled to a transmission, comprising: stopping said engine; tying up said transmission during said engine stop; and during an engine start after stopping said engine, reducing a tie-up force applied to said transmission in response to an operator input and vehicle brake force. The method includes where the operator input is a change in position of a brake pedal or an accelerator pedal. The method includes where the reduction in tie-up force is related to an amount of torque provided to an input shaft of said transmission and an amount of force applied to vehicle brakes. The method also includes where the tie-up force is applied by at least one clutch. Further, the method includes where the clutch is a gear clutch. The method also includes where the clutch is adjusted by varying a pressure of oil supplied to said gear clutch. The method further includes where the torque provided to said input shaft of said transmission is determined from a speed of a torque converter.

The methods of FIGS. 5-7 also provide for a method for starting an engine coupled to a transmission, comprising: stopping said engine; applying a tie-up force to said transmission during said engine stop; restarting said engine in response to an operating condition, said operating condition other than an operator input; and reducing said tie-up force when a transmission input torque exceeds a threshold torque, said threshold torque decreasing as a force applied to a vehicle brake increases. The method also includes where the operating condition is a state of battery charge. The method further includes where the tie-up force is applied by actuating a clutch. The method also includes where the tie-up torque is adjusted in response to operating conditions.

The routines described by FIGS. 5-7 may be executed substantially simultaneously by a controller during an engine start, or the routines may be executed independently, if desired.

As will be appreciated by one of ordinary skill in the art, routines described in FIGS. 5-7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting an engine, comprising:
tracking engine position as spark and fuel are deactivated;
stopping the engine;
predicting a first combustion event of a cylinder for an engine start based on the tracked engine position; and
during the engine start, adjusting a transmission tie-up force in response to a timing of the first combustion event of the cylinder.

2. The method of claim 1, where the transmission tie-up force is adjusted via an actuator of a transmission.

3. The method of claim 2, where said actuator is further adjusted during said start in response to a temperature of said transmission.

4. The method of claim 1, further comprising adjusting a torque converter lockup clutch during the engine start.

5. The method of claim 4, where said cylinder is a first cylinder to combust an air-fuel mixture since said engine stop.

6. The method of claim 1, where the transmission tie-up force is adjusted via a clutch, and where the clutch is adjusted by varying a pressure of oil supplied to said clutch.

7. The method of claim 1, where the transmission tie-up force is adjusted via a gear clutch.

8. The method of claim 1, where the transmission tie-up force is adjusted via an actuator, and where said actuator is further adjusted during said engine start in response to altitude.

9. The method of claim 1, where the transmission tie-up force is adjusted via an actuator, the actuator is further adjusted during said engine start in response to fuel type.

10. A method for starting an engine, comprising:
stopping an engine and tracking engine position during stopping the engine as spark and fuel are deactivated;
adjusting at least one actuator of a transmission to control a transmission tie-up force during said engine stop;
predicting a combustion event of a cylinder based on the tracked engine position; and
during an engine start, adjusting said at least one actuator of said transmission to decrease said transmission tie-up force in response to a timing of the combustion event of the cylinder of said engine since stopping the engine.

11. The method of claim 10, where said at least one actuator is a clutch.

12. The method of claim 11, where said clutch is adjusted by varying a pressure of oil supplied to said clutch.

13. The method of claim 11, where said clutch is a gear clutch.

14. The method of claim 10, where said at least one actuator is adjusted in response to a trailer coupled to a vehicle.

15. The method of claim 10, where said at least one actuator is a torque converter lockup clutch.

16. The method of claim 10, where said at least one actuator is further adjusted during said engine start in response to altitude.

17. A method for starting an engine, comprising:
during a first condition:
starting an engine while a transmission is in an operator selected state; and
during a second condition, different than said first condition:
stopping an engine at a first engine position and tracking engine position as spark and fuel are deactivated;
predicting a first combustion event of a cylinder based on the tracked engine position;
starting said engine while said transmission is in a tied-up state; and
reducing a tie-up force of said transmission in response to the predicted first combustion event of the cylinder since engine stop, said occurrence of a first combustion event related to said first engine position.

18. The method of claim 17, where said first condition is a first engine start after said engine has been stopped by an operator, and where a timing of said reducing said tie-up force is predicted based on said first engine position.

19. The method of claim 17, where said second condition is an engine start after said engine has been stopped via a controller.

20. The method of claim 19, where said tie-up force is reduced by opening a clutch of said transmission.

* * * * *